(12) United States Patent
Hwang et al.

(10) Patent No.: US 10,701,337 B2
(45) Date of Patent: Jun. 30, 2020

(54) METHOD FOR CONTROLLING MULTI-FIELD OF VIEW IMAGE AND ELECTRONIC DEVICE FOR SUPPORTING THE SAME

(71) Applicant: Samsung Electronics Co., Ltd., Suwon-si, Gyeonggi-do (KR)

(72) Inventors: Jin Woo Hwang, Seongnam-si (KR); Woo Hyun Joo, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/679,617

(22) Filed: Aug. 17, 2017

(65) Prior Publication Data
US 2018/0054606 A1    Feb. 22, 2018

(30) Foreign Application Priority Data

Aug. 17, 2016   (KR) .................. 10-2016-0104516

(51) Int. Cl.
*G06T 7/593*    (2017.01)
*G02B 27/22*    (2018.01)
*H04N 13/218*   (2018.01)
*G06K 9/00*     (2006.01)
*H04N 5/232*    (2006.01)
(Continued)

(52) U.S. Cl.
CPC .......... *H04N 13/218* (2018.05); *G02B 30/00* (2020.01); *G06K 9/0063* (2013.01); *G06T 7/593* (2017.01); *H04N 5/23238* (2013.01); *G02B 2027/0123* (2013.01); *G02B 2027/0134* (2013.01); *G02B 2027/0141* (2013.01); *G06K 9/4609* (2013.01);
(Continued)

(58) Field of Classification Search
CPC ........ H04N 13/0217; G02B 2027/0134; G02B 27/22; G06T 7/593
See application file for complete search history.

(56) References Cited

U.S. PATENT DOCUMENTS 9,201,470 B2   12/2015   Kim et al.
9,632,314 B2    4/2017   Cho
(Continued)

FOREIGN PATENT DOCUMENTS

EP    2509303 A2    10/2012
JP    2008-022105 A   1/2008
(Continued)

OTHER PUBLICATIONS

International Search Report dated Dec. 7, 2017, issued in International Application No. PCT/KR2017/008985.
(Continued)

*Primary Examiner* — Jack Dinh
(74) *Attorney, Agent, or Firm* — Jefferson IP Law, LLP

(57) ABSTRACT

An electronic device is provided. The electronic device includes a memory configured to store an image of a multi-field of view (multi-FOV) including an image of a first FOV and an image of a second FOV, a display configured to output the image of the multi-FOV, and a processor configured to be electrically connected with the memory and the display. The process is configured to control to output the image of the first FOV on the display, verify at least one event which meets a condition from the image of the second FOV, and control to provide a notification corresponding to the event in connection with the image of the first FOV, the image being output on the display.

16 Claims, 9 Drawing Sheets

(51) Int. Cl.
*G02B 30/00* (2020.01)
*G02B 27/01* (2006.01)
*G06K 9/46* (2006.01)
*H04N 5/247* (2006.01)

(52) U.S. Cl.
CPC ....... *H04N 5/247* (2013.01); *H04N 2213/005* (2013.01)

(56) References Cited

U.S. PATENT DOCUMENTS

| | | |
|---|---|---|
| 2011/0080425 A1 | 4/2011 | Kim et al. |
| 2012/0169882 A1 | 7/2012 | Millar et al. |
| 2012/0257025 A1 | 10/2012 | Kim et al. |
| 2015/0062434 A1 | 3/2015 | Deng et al. |
| 2015/0331242 A1 | 11/2015 | Cho |
| 2016/0025981 A1 | 1/2016 | Burns |

FOREIGN PATENT DOCUMENTS

| | | |
|---|---|---|
| JP | 5927856 B2 | 6/2016 |
| KR | 10-2011-0037824 A | 4/2011 |
| KR | 10-1417614 B1 | 7/2014 |
| KR | 10-2015-0078242 A | 7/2015 |

OTHER PUBLICATIONS

Extended European Search Report dated Jun. 7, 2019, issued in European Patent Application No. 17841703.6.
European Office Action dated Apr. 3, 2020 issued in European Patent Application No. 17841703.6.

METHOD FOR CONTROLLING MULTI-FIELD OF VIEW IMAGE AND ELECTRONIC DEVICE FOR SUPPORTING THE SAME

CROSS-REFERENCE TO RELATED APPLICATION(S)

This application claims the benefit under 35 U.S.C. § 119(a) of a Korean patent application filed on Aug. 17, 2016 in the Korean Intellectual Property Office and assigned Serial number 10-2016-0104516, the entire disclosure of which is hereby incorporated by reference.

TECHNICAL FIELD

The present disclosure relates to a method for controlling a multi-field of view (multi-FOV) image and an electronic device for supporting the same.

BACKGROUND

Recently, with the rapid spread of commercialization of high-performance image display devices such as head mounted displays (HMDs), an interest and demand for three-dimensional (3D) content has been increased. In response to this, there is a need for a platform for viewing a multi-field of view (multi-FOV) image which becomes a key foundation of 3D content under a more optimized environment.

The above information is presented as background information only to assist with an understanding of the present disclosure. No determination has been made, and no assertion is made, as to whether any of the above might be applicable as prior art with regard to the present disclosure.

SUMMARY

A multi-field of view (multi-FOV) image may correspond to a three-dimensional (3D) spherical object. Compared with this, since an electronic device which plays back a multi-FOV image has a display of a limited size or area, a separate user operation for changing an FOV may be required to view the multi-FOV image through the electronic device. Thus, inconvenience may be caused during viewing of a multi-FOV image, and an immersion level in viewing images may be reduced. Alternatively, if a user operation associated with changing an FOV is not performed, playback of a multi-FOV image may be limited to a specific FOV and a user may fail to experience events which are generated at the same time on a multi-FOV image.

Aspects of the present disclosure are to address at least the above-mentioned problems and/or disadvantages and to provide at least the advantages described below. Accordingly, an aspect of the present disclosure is to provide a method for providing a multi-FOV image to provide a notification for at least one event which appears on a multi-FOV image and easily change an FOV of the multi-FOV image based on the notification and an electronic device for supporting the same.

In accordance with an aspect of the present disclosure, an electronic device is provided. The electronic device includes a memory configured to store an image of a multi-FOV including an image of a first FOV and an image of a second FOV, a display configured to output the image of the multi-FOV, and a processor configured to be electrically connected with the memory and the display.

According to an embodiment, the process may be configured to control to output the image of the first FOV on the display, verify at least one event which meets a condition from the image of the second FOV, and control to provide a notification corresponding to the event in connection with the image of the first FOV, the image being output on the display.

According to various embodiments, the electronic device may prevent important events from being missed by easily recognizing events which appear in different FOVs on a multi-FOV image.

Further, according to various embodiments, the electronic device may increase the convenience of viewing of an image by excluding an FOV change operation for searching for events on a multi-FOV image.

In addition, a variety of effects directly or indirectly ascertained through the present disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
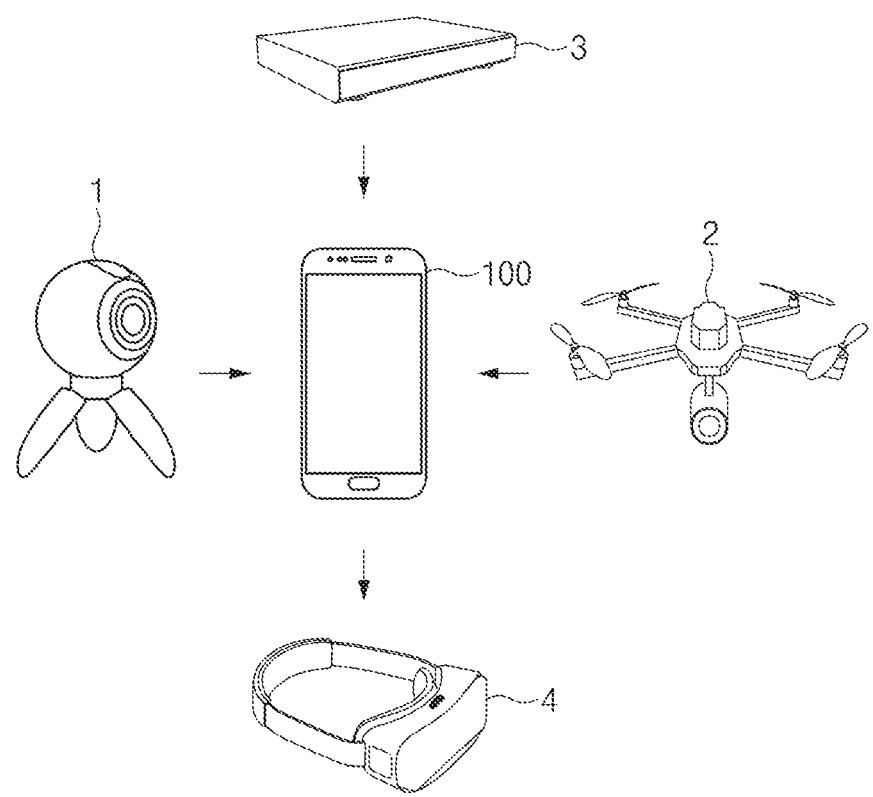
FIG. 1 is a drawing illustrating an environment in which an electronic device is operated, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general-purpose processor (for example, a central processing unit (CPU) or application processor (AP)) for performing corresponding operations by executing at least one software program stored in a memory device.

All terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) audio layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit).

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ or PlayStation™), an electronic dictionary, an electronic key, a camcorder, or an electronic picture frame.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 is a drawing illustrating an environment in which an electronic device is operated, according to an embodiment of the present disclosure.

Referring to FIG. 1, an electronic device 100 may obtain a multi-field of view (multi-FOV) image which may be played back in a plurality of FOVs from an internal device or various external devices. For example, the electronic device 100 may establish a network with at least one of an image capture device 1, a flying device 2 for image capture (e.g., a drone), or a server 3 and may perform wired or wireless communication based on the network to download (or stream) a program or data associated with a multi-FOV image.

The image capture device 1 or the flying device 2 for image capture may include a device or module which may capture a multi-FOV image. For example, the image capture device 1 or the flying device 2 for image capture may include a plurality of camera modules, each of which has a different angle of view. In various embodiments, the image capture device 1 or the flying device 2 for image capture may have a function of editing (e.g., stitching) a plurality of images captured by the plurality of camera modules. Alternatively, the image capture device 1 or the flying device 2 for image capture may transmit the plurality of captured images to the server 3 and may request the server 3 to edit a plurality of images.

In various embodiments, the electronic device 100 may be mounted on a head mounted display (HMD) device 4 to be operated. Alternatively, at least part of the electronic device 100 may be integrated in the form of being included in the HMD device 4 such that the electronic device 100 is operated. Thus, a multi-FOV played back on a display of the electronic device 100 may be displayed on visibility of a user who wears the HMD device 4, and an FOV of an image may be changed in response to motion or movement of a body (e.g., a head) of the user. In this regard, the HMD device 4 may establish a communication channel with the electronic device 100 and may process a user input (e.g., a touch input or motion or movement of the body of the user) associated with controlling a multi-FOV image based on the communication channel. In various embodiments, the electronic device 100 may be mounted on various types of wearable devices, such as a watch, a bracelet, and a necklace, other than the HMD device 4 to be operated.

An embodiment is exemplified as the image capture device 1, the flying device 2 for image capture, or the server 3 is an external device. However, embodiments are not limited thereto. For example, there may be no limit to an external device which may communicate image data with the electronic device 100. Further, the electronic device 100 may be the concept of including the above-mentioned external devices, and the electronic device 100 itself may be referred to as an external device which captures a multi-FOV image.

Figure 2:
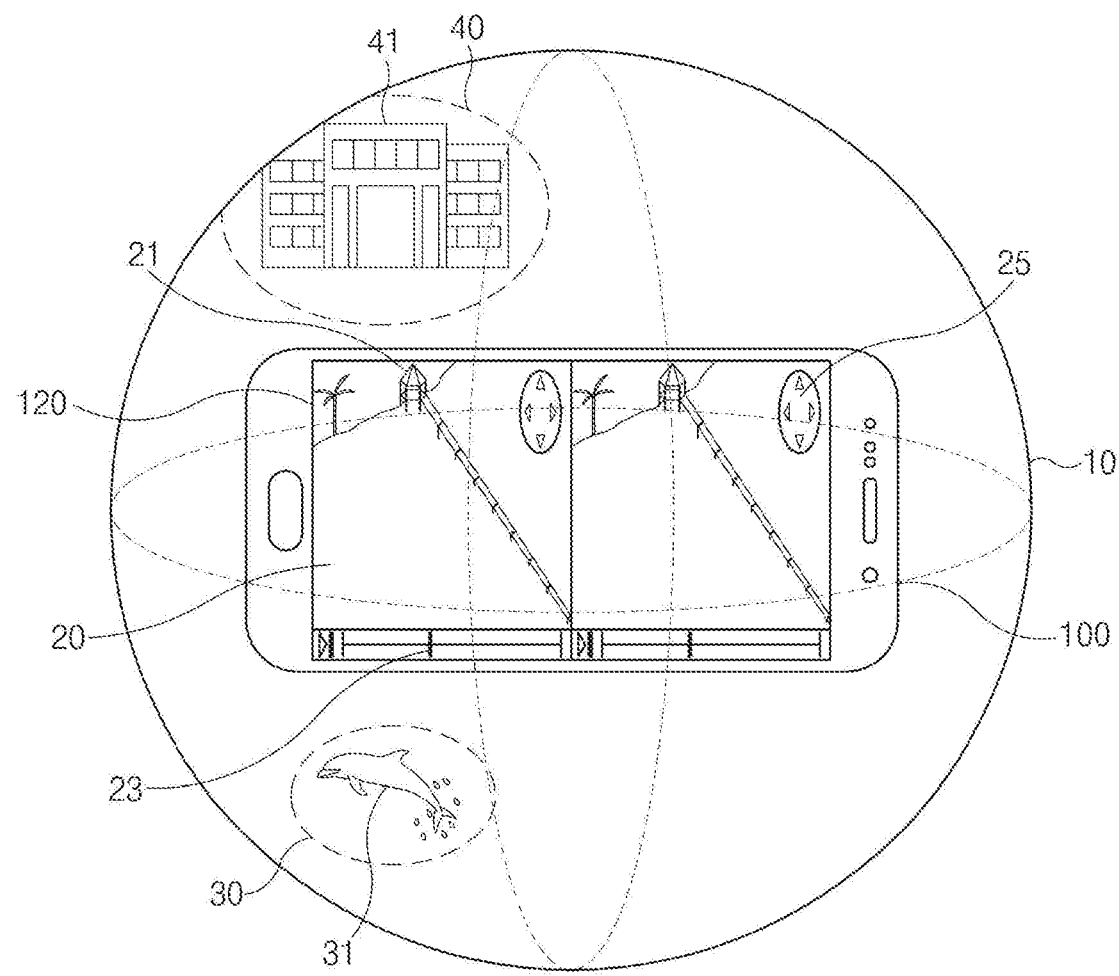
FIG. 2 is a drawing illustrating an example of an environment in which a multi-field of view (multi-FOV) image is played back according to an embodiment of the present disclosure.

FIG. 2 is a drawing illustrating an example of an environment in which a multi-FOV image is played back according to an embodiment of the present disclosure.

Referring to FIG. 2, a multi-FOV image captured by an imaging device (e.g., an image capture device 1, a flying device 2 for image capture, or an electronic device 100 of FIG. 1) may include a 360-degree peripheral region 10 around the imaging device. Compared with this, since a display 120 of the electronic device 100 has a limited display region (or a limited output region), only an image corresponding to a specific FOV (e.g., a first FOV 20) in a multi-FOV image may be displayed (or output) on the display 120.

In an embodiment, at least one object 21, 31, and/or 41 which exist on an image capture space may be included in a peripheral region 10 associated with a multi-FOV image. The at least one object 31 or 41 which appears in an FOV (e.g., a second FOV 30 or a third FOV 40) different from the first FOV 20 may appear at a time different from a current playback time 23 of an image of the first FOV 20 on the multi-FOV image. For example, the second object 31 which appears in the second FOV 30 may be an object which appears after a time elapses from the current playback time 23 of the image of the first FOV 20. Alternatively, the second object 31 of the second FOV 30 may appear at the same or similar time to the current playback time 23 of the image of the first FOV 20. An object, such as the third object 41 (e.g., a building) of the third FOV 40, which has immobility (or is not moved) at a specified location, may appear in the third FOV 40 from a time m playback of the image of the first FOV 20 is started.

As described above, the at least one object 21, 31, and/or 41 may appear in different FOVs or at different times on a multi-FOV image. Thus, if a user operation associated with changing an FOV of a multi-FOV image is not performed (e.g., if an input signal is not provided to an FOV control interface 25), there may be a limit to an image of a specific FOV (e.g., a first FOV 20) such that a user views the multi-FOV image. Alternatively, although an FOV of a multi-FOV image is changed based on the FOV control interface 25, since the user does not know information about at least one object which appears on the multi-FOV image (e.g., FOV or time information where a specific object appears), an FOV may be changed in an impromptu manner. In this case, the user may fail to recognize at least part of the at least one object which appears on the multi-FOV image, or an inconvenient FOV change operation for searching for a specific object may be caused.

In an embodiment, the electronic device 100 may display (or output) visual information about at least one object which appears in an FOV different from a specific FOV on at least a partial region of an image of the specific FOV, displayed (or output) on the display 120. Further, the electronic device 100 may output auditory information or tactile information together with displaying the visual information. The electronic device 100 may provide a notification for appearance of the at least one object to the user who views a multi-FOV image, based on the visual information, the auditory information, or the tactile information.

Figure 3:
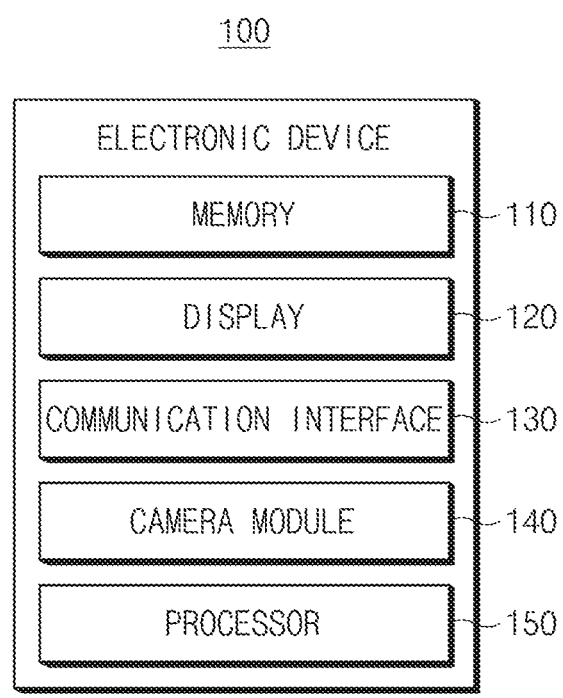
FIG. 3 is a block diagram illustrating a configuration of an electronic device according to an embodiment of the present disclosure.

FIG. 3 is a block diagram illustrating a configuration of an electronic device according to an embodiment of the present disclosure.

Referring to FIG. 3, an electronic device 100 may include a memory 110, a display 120, a communication interface 130, a camera module 140, and a processor 150. In various embodiments, the electronic device 100 may fail to include at least one of the above-mentioned elements or may further include other element(s).

The memory 110 may store at least one program or data associated with operating an image playback function of the electronic device 100. For example, the memory 110 may store at least one multi-FOV image downloaded (or streamed) from an external device (e.g., an image capture device 1, a flying device 2 for image capture, or a server 3 of FIG. 1). Further, the memory 110 may store a multi-FOV image captured by at least one image sensor (not shown) included in the camera module 140 or the electronic device 100.

The display 120 may display (or output) a variety of content (e.g., text, an image, a video, an icon, a symbol, or the like) in response to a user input signal or specified scheduling information. For example, the display 120 may display at least one multi-FOV image stored in the memory 110 under control of the processor 150 based on the user input signal. The display 120 may display an image of one FOV of the multi-FOV image and may change an image to a different FOV based on control of the processor 150, associated with changing an FOV of the image.

The communication interface 130 may support communication between the electronic device 100 and the external device (e.g., the image capture device 1, the flying device 2 for image capture, or the server 3). For example, the communication interface 130 may communicate with the external device by establishing wired or wireless communication according to a defined protocol with the external device and accessing a network based on the wired or wireless communication.

In various embodiments, the electronic device 100 may generate a multi-FOV image itself, other than a multi-FOV image obtained from the external device (e.g., the image capture device 1, the flying device 2 for image capture, or the server 3). In this regard, the electronic device 100 may include the plurality of camera modules 140. Each of the plurality of camera modules 140 may be located in the electronic device 100 to have a different angle of view (or have an angle of view, at least part of which is overlapped). For example, each of the plurality camera modules 140 may be located on the electronic device 100 to capture a region divided every 120 degrees. Alternatively, the plurality of camera modules 140 may be located at opposite locations on the electronic device 100 to capture the front and rear of the electronic device 100. In various embodiments, the plurality of camera modules 140 may be fixed to specified points on the electronic device 100 or may be located such that at least some of the plurality of camera modules 140 are movable in response to a control signal such as a user input. A plurality of images captured by the plurality of camera modules 140 may be stitched based on execution of, for example, an image editing program to be implemented as a multi-FOV image.

The processor 150 may be electrically connected with at least one (e.g., the memory 110, the display 120, the communication interface 130, the camera module 140, or the like) of the elements of the electronic device 100 and may perform control, communication, an arithmetic operation, or data processing for the element. For example, the processor 150 may perform image processing for a multi-FOV image which is obtained from the external device (e.g., the image capture device 1, the flying device 2 for image capture, or the server 3) or is generated by the plurality of camera modules 140. In this regard, the processor 150 may divide each of images of a plurality of FOVs (e.g., an image of a first FOV 20, an image of a second FOV 30, an image of a third FOV 40, and/or the like of FIG. 2) constituting a multi-FOV image into a plurality of frames. The plurality of frames may be, for example, a static image and may continue at intervals (e.g., second) of a specified time to constitute an image of a specific FOV.

In an embodiment, the processor 150 may analyze an initial frame for each of the images of the plurality of FOVs (e.g., the image of the first FOV 20, the image of the second FOV 30, the image of the third FOV 40, and/or the like) based on an edge filter (e.g., a Sobel filter, a Prewitt filer, or the like). For example, the processor 150 may extract at least one object based on an edge filtered on each initial frame. The processor 150 may perform, for example, a machine learning algorithm (e.g., deep learning) for the at least one extracted object. In this operation, the processor 150 may compare an edge of a subject (e.g., a landmark or the like), which is specified from a user or is stored in a database of the memory 110, with an edge of an object extracted from the initial frame. The processor 150 may specify an object, which is identical to the edge of the subject in rate, shape, or structure by a specified size or more.

In an embodiment, the processor 150 may extract a dynamic object with reference to a difference image between a plurality of frames corresponding to each of the images of the plurality of FOVs. For example, the processor 150 may compare a plurality of frames for the image of the first FOV 20. If there is a frame, a pixel of which is changed, the processor 150 may determine that a dynamic object appears on the image of the first FOV 20. If movement of a dynamic object (or a change rate of a pixel) is greater than or equal to a specified size (or level), the processor 150 may specify the dynamic object as an event.

In various embodiments, the event may be specified in response to control of the user in an operation of capturing a multi-FOV image based on the external device (e.g., the image capture device 1 or the flying device 2 for image capture) or the electronic device 100. Alternatively, the event may be specified by control of the user in an editing operation e.g., stitching) associated with a multi-FOV image.

In an embodiment, the processor 150 may store an FOV and a time range, where at least one object specified as the event appears on a multi-FOV image, in the memory 110. Further, the processor 150 may extract at least part of the time range as a display object (or a notification) (e.g., a highlight image) for the event. For example, if an object (e.g., a building) specified as the event has immobility (or is not moved), the processor 150 may extract a time range, from a time when the object initially appears to a time when a specified time elapses, in the time range as the display object. Alternatively, if the object specified as the event has mobility, the processor 150 may extract a time range of a specified size, including a time with the largest movement size of the object, in the time range as the display object. The processor 150 may store the extracted display object in the memory 110.

In an embodiment, the above-mentioned display object may be output on one region of an image of a specified FOV displayed on visibility of the user and may function as a hyperlink which supports to change an image to an FOV where an object (or an event) corresponding to the display object appears. In various embodiments, the display object may include at least one of a moving image, a thumbnail image, or an icon associated with the event.

Figure 4:
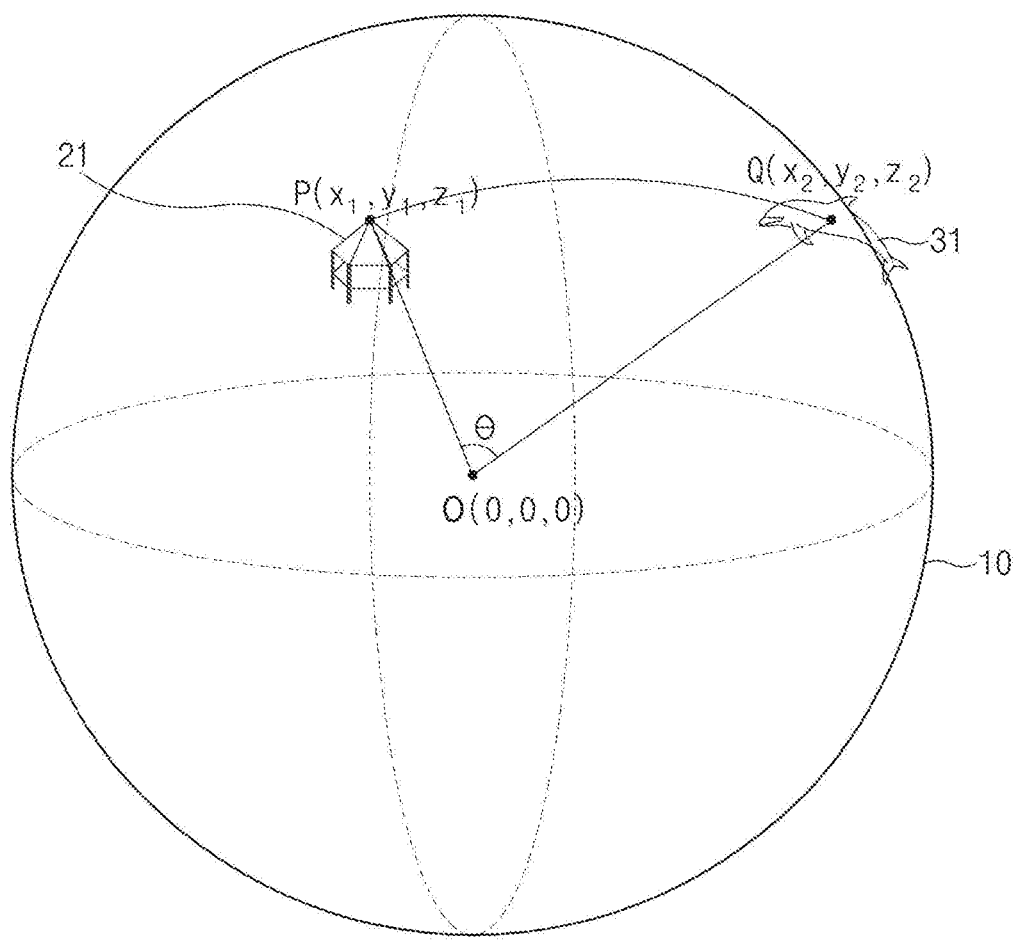
FIG. 4 is a drawing illustrating an example of calculating a relative location for objects on a multi-FOV image according to an embodiment of the present disclosure.

FIG. 4 is a drawing illustrating an example of calculating a relative location for objects on a multi-FOV image according to an embodiment of the present disclosure.

Referring to FIG. 4, a processor 150 of FIG. 3 may analyze a multi-FOV image stored in a memory 110 of FIG. 3 to obtain a three-dimensional (3D) coordinate for each of objects 21 and 31 which appear on the multi-FOV image. The processor 150 may calculate a distance to each of coordinates P(x1, y1, z1) and Q(x2, y2, z2) of the objects 21 and 31 with respect to a coordinate (0, 0, 0) of a center O of a peripheral region 10 associated with the multi-FOV image. Alternatively, the processor 150 may calculate the shortest distance between the coordinate (0, 0, 0) of the center O of the peripheral region 10 and at least one coordinate included in an edge of each of the objects 21 and 31. The processor 150 may substitute the calculated distance information into a series of arithmetic processes to obtain information about a relative location (e.g., an angle) between the objects 21 and 31 with respect to the center O of the peripheral region 10. In an embodiment, the location information may be converted into a specified time unit in connection with calculating a time when an output of the display object on one region of an image of a specific FOV is started. A description will be given below of the location information.

Figure 5:
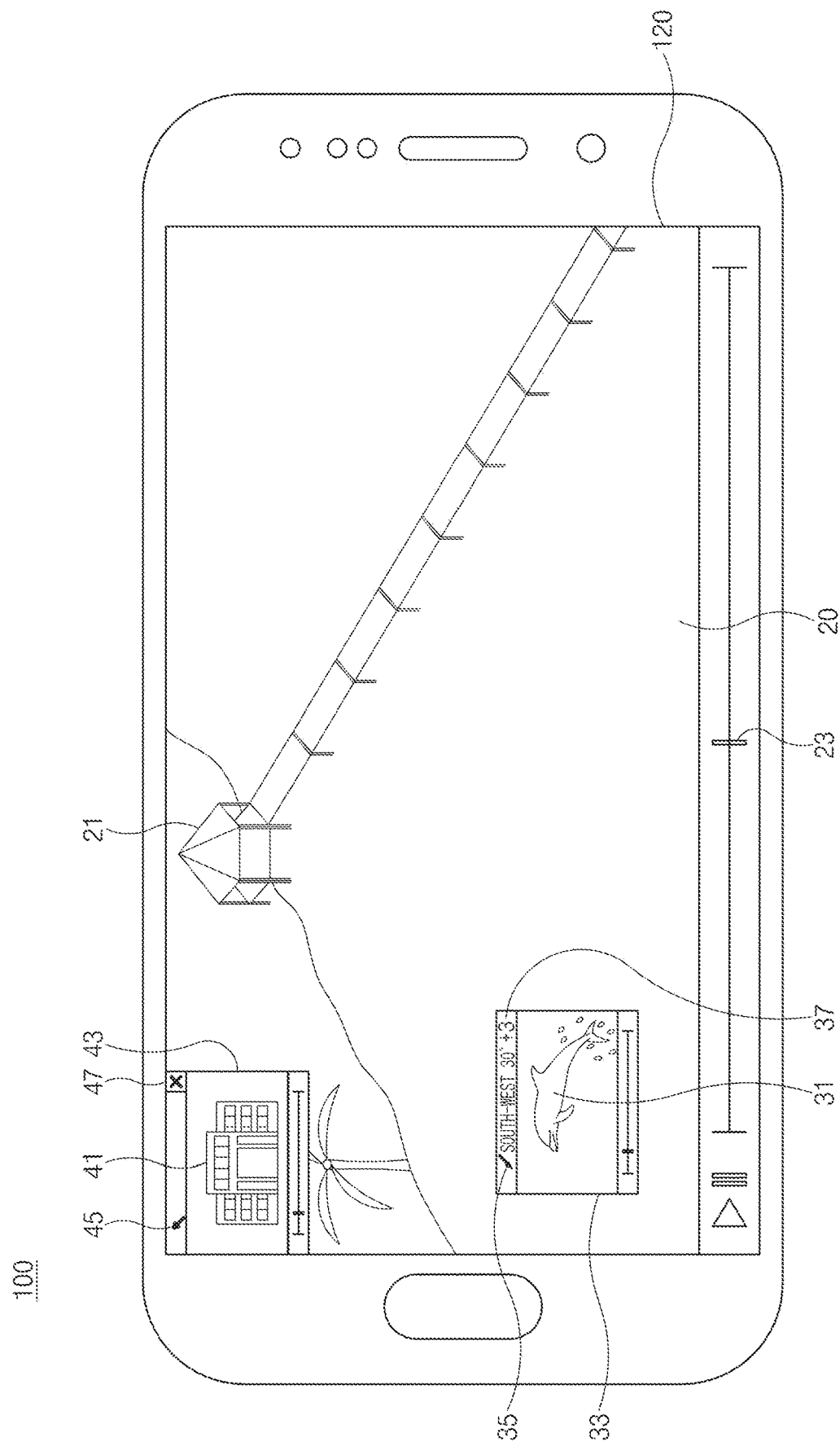
FIG. 5 is a drawing illustrating an image of a first FOV of a multi-FOV according to an embodiment of the present disclosure.
Figure 6:
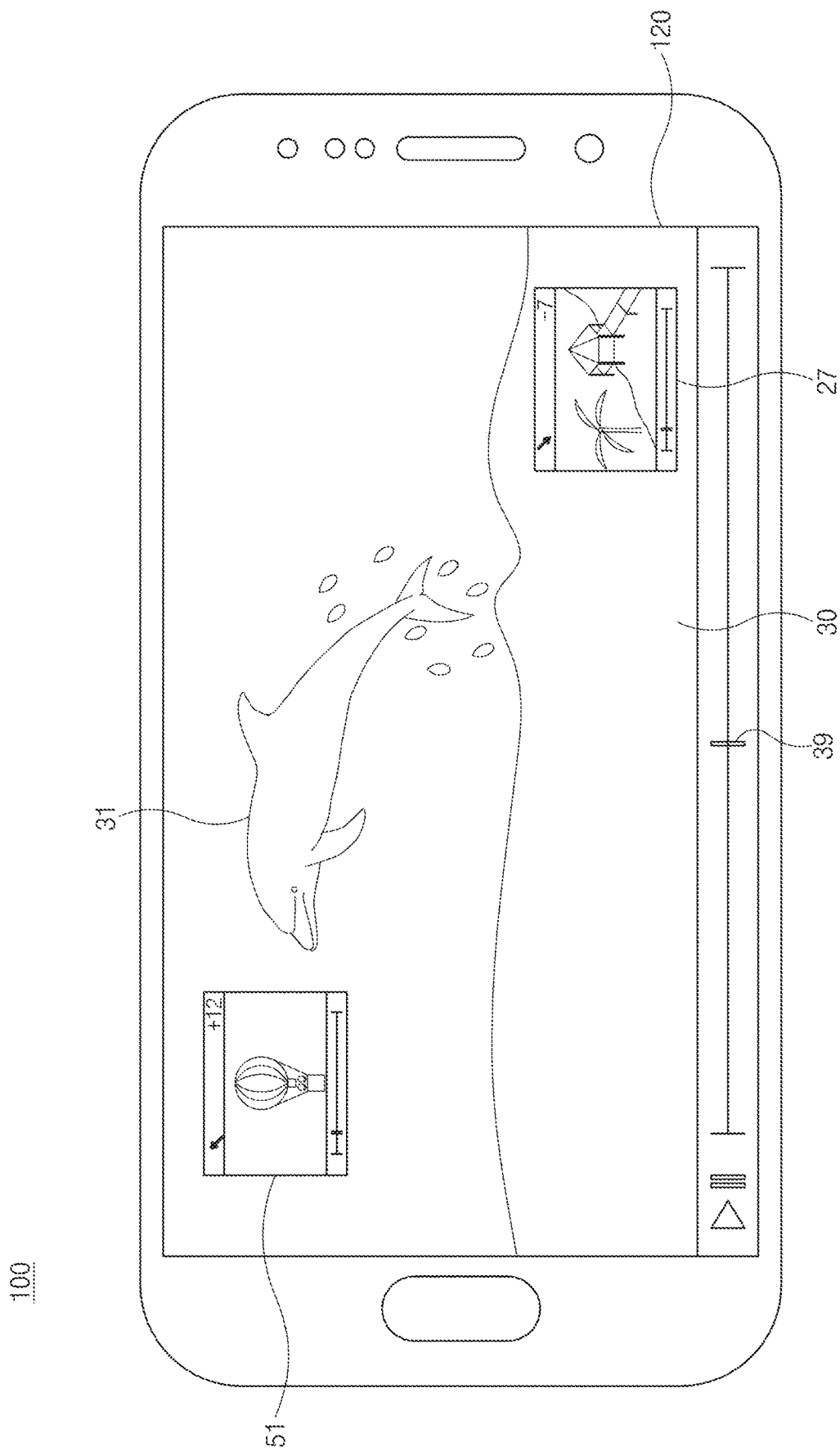
FIG. 6 is a drawing illustrating an image of a second FOV of a multi-FOV according to an embodiment of the present disclosure.
Figure 7:
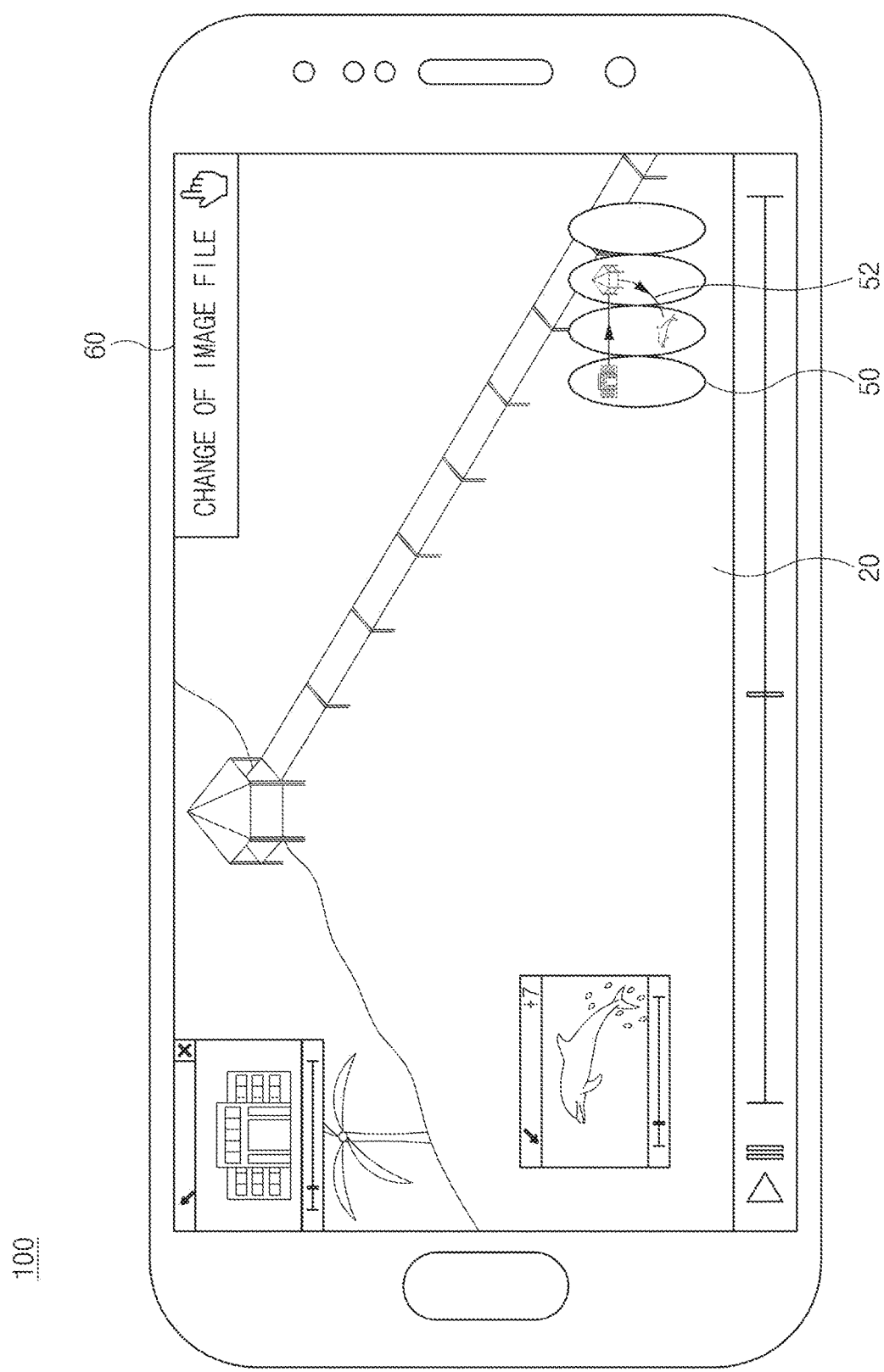
FIG. 7 is a drawing illustrating an image of a first FOV of a multi-FOV according to another embodiment of the present disclosure.

In FIGS. 5 to 7 below, an image of a specific FOV displayed or output on a display region of an electronic device may be shown in the form of a single eye (e.g., in a form where one screen is output on the display region) for convenience of description. Herein, the image of the specific FOV in the form of the single eye may be changed to a form of both eyes (e.g., a form where the display region is divided into a plurality regions and where the same or similar screen is output on each of the plurality of divided regions) in connection with the electronic device which is mounted on an HMD device or is integrated with the HMD device.

FIG. 5 is a drawing illustrating an image of a first FOV of a multi-FOV according to an embodiment of the present disclosure.

Referring to FIG. 5, a multi-FOV image stored in a memory 110 of FIG. 3 may be displayed (or output) on a display 120 of an electronic device 100 of FIG. 3 in response to control of a processor 150 of FIG. 3. As playback of the multi-FOV image is started, a user may view an image of a specific FOV (e.g., a first FOV 20) in the multi-FOV image.

In an embodiment, the processor 150 may monitor the memory 110 in real time or at a specified period and may identify a display object (e.g., a highlight image) associated with the first FOV 20. For example, the processor 150 may identify the display object associated with the first FOV 20 by determining whether an object (or event) associated with the display object appears within a specified time range with respect to a current playback time 23 (e.g., 20 seconds) of the image of the first FOV 20 (e.g., a range of +20 seconds and −4 seconds with respect to 20 seconds). If the object (or event) associated with the display object appears within the specified time range, the processor 150 may determine the display object as a display object associated with the first FOV 20 and may output the display object on at leak one region of the image of the first FOV 20. In this operation, the processor 150 may determine a relative direction between the first FOV 20 and the object associated with the display object. For example, the processor 150 may determine a mutually relative direction based on a 3D coordinate of each of a central point in the image of the first FOV 20 and the object associated with the display object.

In an embodiment, the processor 150 may output the display object associated with the first FOV 20 on a specific region in the image of the first FOV 20 based on information about the relative direction. For example, if determining that a first object 31 according to a first display object 33 associated with the first FOV 20 appears in a different FOV of a southwest direction with respect to the central point of the first FOV 20, the processor 150 may output the first display object 33 on a region corresponding to the southwest direction among edge regions of the image of the first FOV 20. In the same or similar operation to this operation, if a second object 41 appears in a different FOV of a northwest direction from the central point of the first FOV 20, the processor 150 may output a second display object 43 associated with the second object 41 on a northwest edge region of the image of the first FOV 20. In various embodiments, if the first object 31 and the second object 41 appear in the same or similar direction to each other, the first display object 33 and the second display object 43 may be displayed such that at least part of the first display object 33 and at least part of the second display object 43 are overlapped with each other.

In an embodiment, if the above-mentioned display object 33 or 43 is determined as being associated with a specific FOV except for the first FOV 20 and is output on an image of the specific FOV, it may be output on a region different from the above-mentioned output region (e.g., the southwest region or the northwest region) on the image of the first FOV 20. For example, if the second display object 43 is output on one region of an image of a specific FOV, since the relative direction is determined based on a central point of the specific FOV and an FOV where the second object 41 associated with the second display object 43 appears, the relative direction may be determined as a direction different from the southwest direction with respect to the central point of the first FOV 20. Thus, the second display object 43 may be output on a region different from a southwest edge region of the image of the first FOV 20 among edge regions of the image of the specific FOV.

In an embodiment, direction information 35 or 45 associated with the relative direction may be included in at least one region of the first display object 33 or the second display object 43 output on one region of the image of the first FOV 20. The direction information 35 or 45 may be a visual object indicating a direction for an FOV where the object of the first display object 33 or the second display object 43 appears with respect to the central point of the first FOV 20. In various embodiments, the direction information 35 or 45 may include at least one of text, an icon, or a symbol.

In various embodiments, the first display object 33 or the second display object 43 may be output with luminance (e.g., semi-transparency) of a specified level in connection with securing visibility of the image of the first FOV 20. Further, in various embodiments, in an operation of outputting at least one display object on an FOV image which is currently being played back, the processor 150 may control an acoustic device included in the electronic device 100 or an external device (e.g., an HMD device 4 or the like of the FIG. 1) electrically connected with the electronic device 100 to output a specified notification sound (or a notification).

In an embodiment, the processor 150 may output each of the first display object 33 and the second display object 43 at a different time on the image of the first FOV 20. As described with reference to FIG. 4, a relative location (e.g., an angle) may be calculated between an object which appears on the image of the first FOV 20 and an object which appears in an FOV except for the first FOV 20. In an embodiment, the processor 150 may calculate a previous display time of a display object based on location information between objects. The previous display time means that an object associated with a display object (e.g., a display object corresponding to an FOV different from the first FOV 20) appears in an FOV except for the first FOV 20 if a time elapses after the display object is output. In this regard, it may be assumed that an angle between an object 21 which appears on the image of the first FOV 20 and the first object 31 associated with the first display object 33 of an FOV different from the first FOV 20 is 30 degrees. As another assumption, it may be assumed that the first object 31 associated with the first display object 33 appears on an image of an FOV different from the first FOV 20 at 30 seconds which are a time within a time range (e.g., 16 seconds to 40 seconds) associated with the current playback time 23 (e.g., 20 seconds) of the image of the first FOV 20. In this case, the processor 150 may calculate a previous display time as 3 seconds by applying 1 second per 10 degrees to 30 degrees and may output the first display object 33 on one region of the image of the first FOV 20 at 27 seconds which are a time before the previous display time (e.g., 3 seconds) from 30 seconds which are a time when the first object 31 associated with the first display object 33 appears. The 27 seconds may be after 7 seconds with respect to the current playback time 23 (e.g., 20 seconds) of the image of the first FOV 20. In an embodiment, an object, such as the second object 41 (e.g., the building) associated with the second display object 43, which has no mobility (or has immobility), may continuously appear during a playback time of a multi-FOV image in an FOV different from the first FOV 20. In this case, the processor 150 may output the second display object 43 on one region of the image of the first FOV 20 from a playback start time of the image of the first FOV 20. In various embodiments, at least one display object output on the image of the first FOV 20 may disappear after a specified time elapses from starting displaying the display object or may disappear in response to an input (e.g., a touch) of a user, provided to at least one point of the display object (e.g., reference numeral 47 of the second display object 43).

In an embodiment, the above-mentioned previous display time 37 may be included in at least one region of the first display object 33 or the second display object 43. With reference to the first display object 33, for example, the previous display time 37 may be provided concurrently with outputting the first display object 33 at a time (e.g., 27 seconds) when a time (e.g., the 7 seconds) calculated through a series of arithmetic operations elapses from the current playback time 23 (e.g., 20 seconds) of the image of the first FOV 20.

In an embodiment, the specified time range (e.g., 16 seconds to 40 seconds) with respect to the current playback time 23 of the image of the first FOV 20 may be changed in response to playback of the image of the first FOV 20. Thus, a display object of an FOV different from the first FOV 20 met in a new time range may be further output. Alternatively, the previous display time 37 may be updated. For example, if the current playback time 23 of the image of the first FOV 20 is changed (e.g., increased) by 1 second, the previous display time 37 may also be changed (e.g., decreased) by 1 second. Thus, a state where the previous display time 37 is indicated with a negative number may refer to a state where appearance of an object associated with the display object is completed in an FOV different from the first FOV 20 (or a state where a time elapses from the completion of the appearance). In various embodiments, if the previous display time 37 is indicated with a positive number, the processor 150 may process a display object including the previous display time 37 using a first display effect (e.g., display the display object in a color). On the other hand, if the previous display time 37 is indicated with a negative number, a display object including the previous display time 37 may be processed using a second display effect (e.g., display the display object in black and white) by control of the processor 150.

In an embodiment, if a user provides an input (e.g., a touch input using his or her body or touch pen) to at least one region of the above-mentioned display object, the processor 150 may change an FOV of a multi-FOV image. For example, if the user input is provided to the first display object 33 output on one region of the image of the first FOV 20, the processor 150 may change the image of the first FOV 20 to an image of an FOV corresponding to the first display object 22. In this operation, the processor 150 may store information about the image of the first FOV 20 before the change (e.g., FOV information and appearance time information of the object 21 which appears on the image of the first FOV 20).

FIG. 6 is a drawing illustrating an image of a second FOV of a multi-FOV according to an embodiment of the present disclosure.

Referring to FIG. 6, a processor 150 of FIG. 3 may receive a user input provided to at least one region of a specific display object (e.g., a first display object 33 of FIG. 5) and may control a display 120 to change an image of a first FOV 20 of FIG. 5, displayed on visibility of a user (or output on the display 120), to an image of an FOV (e.g., a second FOV 30) corresponding to the first display object 33. Thus, the image of the second FOV 30 may be displayed (or output) on the display 120, and at least one object 31 which appears in the second FOV 30 may be displayed. In various embodiments, the processor 150 may control the display 120 to display an image of at least one FOV, which exists between, for example, the first FOV 20 and the second FOV 30 (or is accompanied in a process of changing the first FOV 20 to the second FOV 30), at a specified speed (e.g., hyperlapse) in the operation of changing the image of the first FOV 20 to the image of the second FOV 30.

In an embodiment, if changed to the image of the second FOV 30, the processor 150 may access a memory 110 of FIG. 3 and may identify a display object associated with an FOV different from the second FOV 30. The processor 150 may determine whether an object associated with the identified display object appears within a specified time range with respect to a current playback time 39 of the image of the second FOV 30 (e.g., a range of +20 seconds and −4 seconds with respect to the current playback time 39). If the object appears within the specified time range, the processor 150 may output a display object (e.g., a display object 51) corresponding to the object on at least one region of the image of the second FOV 30.

In an embodiment, the processor 150 may display (or output) information about an image of a previous FOV (e.g., the first FOV 20), stored in the memory 110, on at least a partial region of the image of the second FOV 30 when changed to the second FOV 30. For example, the processor 150 may display the image of the first FOV 20, which is the image of the previous FOV as an object (e.g., a return object 27) in the form of being the same or similar to the above-mentioned display object. If an input by a user (e.g., a touch input using his or her body or touch pen) is provided to at least one region of the return object 27, the image of the second FOV 30 which is being displayed (or output) may be changed (or returned) to the image of the first FOV 20.

FIG. 7 is a drawing illustrating an image of a first FOV of a multi-FOV according to another embodiment of the present disclosure. An image of a first FOV 20 shown in FIG. 7 may be operatively the same or similar to an image of a first FOV described with reference to FIG. 5. Hereinafter, a description will be given of elements different from the image of the first FOV of FIG. 5.

Referring to FIG. 7, for example, a development image 50 of a multi-FOV image may be scaled down and displayed on at least one region of the image of the first FOV 20. The development image 50 may include content (e.g., an icon) associated with at least one object which appears on a multi-FOV image. In various embodiments, a path guide line 52 based on a relative time when at least one object appears on a multi-FOV image may be displayed on the development image 50.

In an embodiment, for example, an interface 60 for supporting to play back a separate image file (e.g., a single FOV image file, a multi-FOV image file, or the like) different from a multi-FOV image file which is currently being played back may be displayed on at least one region of the image of the first FOV 20. In this regard, in one embodiment, in an operation of downloading (or streaming) an image file (or image data) from an external device (e.g., an image capture device 1, a flying device 2 for image capture, or a server 3 of FIG. 1), for example, a processor 150 of FIG. 3 may obtain image capture location information of the external device for the image file. Alternatively, if an electronic device 100 captures an image, the processor 150 may obtain image capture location information of the electronic device 100 based on a global positioning system (GPS). The image capture location information may be stored in a memory 110 of FIG. 3 together with the image file.

In an operation of controlling playback of a multi-FOV image, the processor 150 may verify image capture location information about the multi-FOV image file and may compare the image capture location information with at least one image capture location information stored in the memory 110. In an embodiment, if at least one of image files stored in the memory 110 has image capture location information in a specified distance range with respect to an image capture location of a multi-FOV image file to be currently played back, the processor 150 may output the interface 60 (e.g., an interface for supporting to play back an image file having a similar image capture location to that of a multi-FOV image which is being played back) on at least one region of a multi-FOV image (e.g., the image of the first FOV 20) started to be played back. In various embodiments, the interface 60 may include the above-mentioned hyperlink function.

In various embodiments, if capturing a multi-FOV image in real time based on the electronic device 100 including a plurality of camera modules 140 of FIG. 3, the processor 150 may access the memory 110 and may identify an image file captured within a specified range with respect to an image capture location of the electronic device 100 based on the GPS. If at least one image file having the same or similar image capture location information to a location of the electronic device 100 which is capturing an image in real time is identified, the processor 150 may display an interface for supporting to play back the identified image file (or change to the identified image file) on at least one region of an image which is being captured in real time.

For example, in connection with the above-mentioned details, a user may park a vehicle on a specified area in a wide parking lot and may capture a first multi-FOV image for a parking area. In this operation, the vehicle may be specified as an event in response to control of the user. The captured first multi-FOV image may be stored in the memory 110 of the electronic device 100. Thereafter, if the user captures a second multi-FOV image in the parking lot, the processor 150 may identify a file for the first multi-FOV image captured in a similar place based on current location information of the electronic device 100 and may display an interface associated with playing back the first multi-FOV image file on at least one region of the second multi-FOV image which is being captured (or changing to the first multi-FOV image file). Thus, the user may easily search for an area in which the vehicle is parked with reference to the first multi-FOV image.

As another example, the support to play back another image file (or the support to change to the other image file) may be applied to a plurality of image capture devices. In this regard, there may be a plurality of image capture devices, each of which captures an image for a specific FOV in the same or similar location. The plurality of image capture devices may include a network established between, for example, a server (e.g., a server 3 of FIG. 1) and the image capture devices. An image of a specific FOV, captured by each of the plurality of image capture devices, may be transmitted to the server over the network at a specified period or in real time. A first image capture device among the plurality of image capture devices may request the server to transmit an FOV image captured by another image capture device based on the network. In this case, the server may transmit FOV image files of image capture devices adjacent to the first image capture device to the first image capture device based on image capture location information of the plurality of image capture devices. A process of the first image capture device may output an interface for supporting to play back an image file of at least one FOV, transmitted from the server, on at least one region of an image of a specific FOV, which is being played back on the first image capture device (or change to the image file of the at least one FOV).

An electronic device according to various embodiments may include a memory configured to store an image of a multi-FOV including an image of a first FOV and an image of a second FOV, a display configured to output the image of the multi-FOV, and a processor configured to be electrically connected with the memory and the display.

According to various embodiments, the processor may control to output the image of the first FOV on the display, may verify at least one event which meets a specified condition from the image of the second FOV, and may control to provide a notification corresponding to the event in connection with the image of the first FOV, the image being output on the display.

According to various embodiments, the processor may verify at least one event, which occurs within a specified time range with respect to a current playback time of the image of the first FOV, as the event.

According to various embodiments, the processor may control to change the image of the first FOV, output on the display, to at least part of the image of the second FOV in response to a user input on the notification.

According to various embodiments, the processor may control to provide another notification for supporting a change to the image of the first FOV, in connection with the at least part of the image of the second FOV.

According to various embodiments, the processor may specify the change to the image of the first FOV as a return event.

According to various embodiments, when changing to the image of the first FOV or the image of the second FOV, the processor may control to provide at least part of the image of the multi-FOV at a specified speed in the image change.

According to various embodiments, the processor may calculate a relative location of the event with respect to the first FOV and may calculate a time when a notification corresponding to the event is provided, in connection with the relative location.

According to various embodiments, the processor may specify at least one of an object having mobility of a specified size or more, included in the image of the multi-FOV, or an object which is identical to a specified subject by a specified size or more as the event.

According to various embodiments, the processor may control to provide a range, from a time when the event initially occurs to a time when a specified time elapses, in a time range where the event occurs on the image of the multi-FOV as a notification corresponding to the event.

According to various embodiments, the processor may control to provide information about a time interval between a time when the providing of the notification is started and a time when the event occurs, as at least part of the notification corresponding to the event.

According to various embodiments, the processor may control to provide information about a relative direction between the first time and the second time associated with the event, as at least part of the notification corresponding to the event.

According to various embodiments, the processor may control to process a first notification corresponding to an event which occurs before a current playback time of the image of the first FOV and a second notification corresponding to an event which will occur after the current playback time using different effects.

According to various embodiments, the processor may generate a development image corresponding to the multi-FOV, may control to output the development image on at least a partial region of the display, and may include at least one information associated with the event on the development image.

According to various embodiments, the electronic device may be configured to be mountable on a HMD device.

According to various embodiments, the electronic device may be referred to as a portable communication device.

According to various embodiments, the portable communication device may include a communication module, a memory, and a processor configured to be electrically connected with the communication module and the memory.

According to various embodiments, the processor may verify a multi-FOV image stored in the memory, may control to output a first image corresponding to a first FOV of the multi-FOV image, may control to provide a notification indicating at least part of a second image corresponding to a second FOV of the multi-FOV image in connection with outputting the first image, may control to obtain a user input on the notification, and may control to output at least part of the second image in response to the user input.

According to various embodiments, if the second image includes at least one event which occurs within a specified time range with respect to a current playback time of the first image, the processor may control to provide a range, from a time when the event initially occurs to a time when a specified time elapses, in a time range when the event occurs on the second image as the notification.

Figure 8:
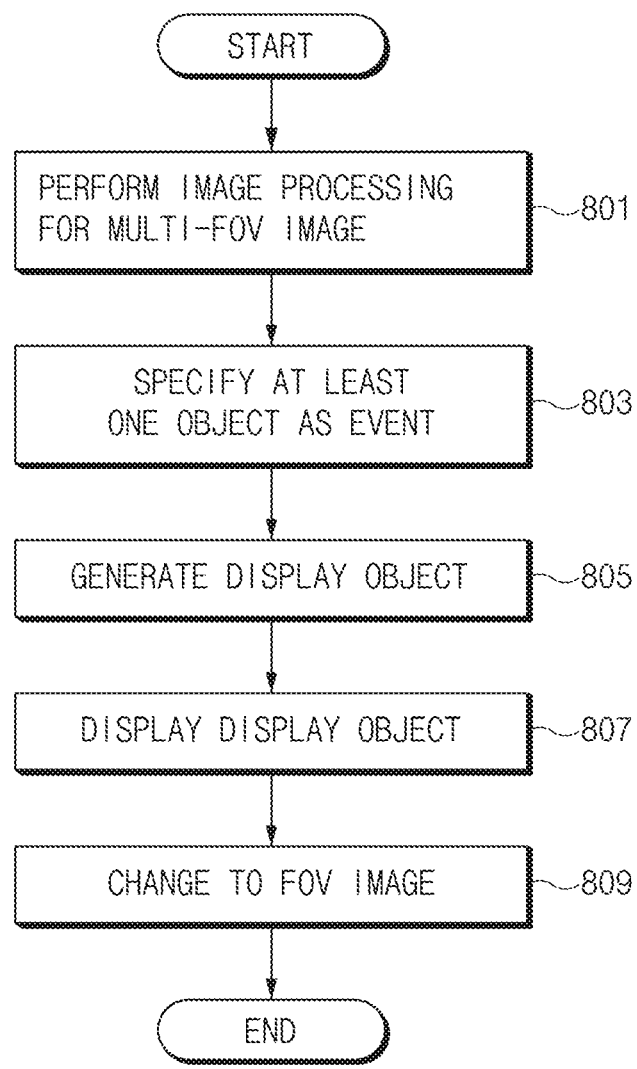
FIG. 8 is a flowchart illustrating a method for controlling a multi-FOV in an electronic device according to an embodiment of the present disclosure.

FIG. 8 is a flowchart illustrating a method for controlling a multi-FOV in an electronic device according to an embodiment of the present disclosure.

Referring to FIG. 8, in operation 801, a processor (e.g., a processor 150 of FIG. 3) an electronic device (e.g., an electronic device 100 of FIG. 3) may perform image processing for a multi-FOV image which is obtained from an external device (e.g., an image capture device 1, a flying device 2 for image capture, or a server 3 of FIG. 1) and is captured by the electronic device. In this operation, the processor may extract at least one object included in the multi-FOV image.

In operation 803, the processor may specify at least one object having similarity of a specified size or more with at least one subject, which is specified from a user or is stored in a database of a memory (e.g., a memory 110 of FIG. 3), (e.g., similarity in which an edge of the object and the edge of the subject are the same as each other in rate, shape, or structure by a specified size or more) as an event. Alternatively, the processor may specify at least one dynamic object, which moves on the multi-FOV image by a specified size or more, as an event. The processor may store an FOV and a time range where the at least one object specified as the event appears on the multi-FOV image in the memory.

In operation 805, the processor may extract at least part of a time range in which the at least one specified event (or object) appears on the multi-FOV image as a display object (e.g., a highlight image) and may store the extracted display object in the memory. For example, if the object (e.g., a building) specified as the event has immobility (or is not moved), the processor may extract a range, from a time when an object initially appears to a time when a specified time elapses, in the time range as a display object. Alternatively, if the object specified as the event has mobility (or is a dynamic object), the processor may extract a time range of a specified size, including a time with the largest movement size of an object, in the time range as a display object.

In operation 807, the processor may monitor the memory and may identify a display object corresponding to an FOV different from an image of a first FOV, which is currently being played back on a display (e.g., a display 120 of FIG. 3). The processor may output at least one display object, associated with an event (or object) which appears within a time range (e.g., +20 seconds and −4 seconds) with respect to a current playback time of the image of the first FOV, among the identified display objects on one region of the image of the first FOV. In this operation, the processor may calculate a previous display time of a display object based on information about a relative location (e.g., an angle) between an object which appears in the first FOV and an object which appears in another FOV and may reflect the calculated previous display time in outputting the display object.

In operation 809, if an input of a user (e.g., a touch input using his or her body or touch pen) is provided to any one of the at least one display object output on the at least one region of the image of the first FOV, the processor may change the image of the first FOV, which is currently being played back, to an FOV image associated with the display object to which the input is provided.

A method for controlling a multi-FOV image in an electronic device according to various embodiments may include outputting an image of a first FOV of a multi-FOV image, verifying at least one event which meets a specified condition from an image of a second FOV of the multi-FOV image, and providing a notification corresponding to the event in connection with the image of the first FOV.

According to various embodiments, the method may further include changing the image of the first FOV to at least part of the image of the second FOV in response to a user input on the notification.

According to various embodiments, the providing of the notification may include providing a range, from a time when the event initially occurs to a time when a specified time elapses, in a time range when the event occurs on the multi-FOV image as a notification corresponding to the event.

According to various embodiments, the providing of the notification may include calculating a relative location of the event with respect to the first FOV and calculating a time when the notification corresponding to the event is provided, in connection with the relative location.

Figure 9:
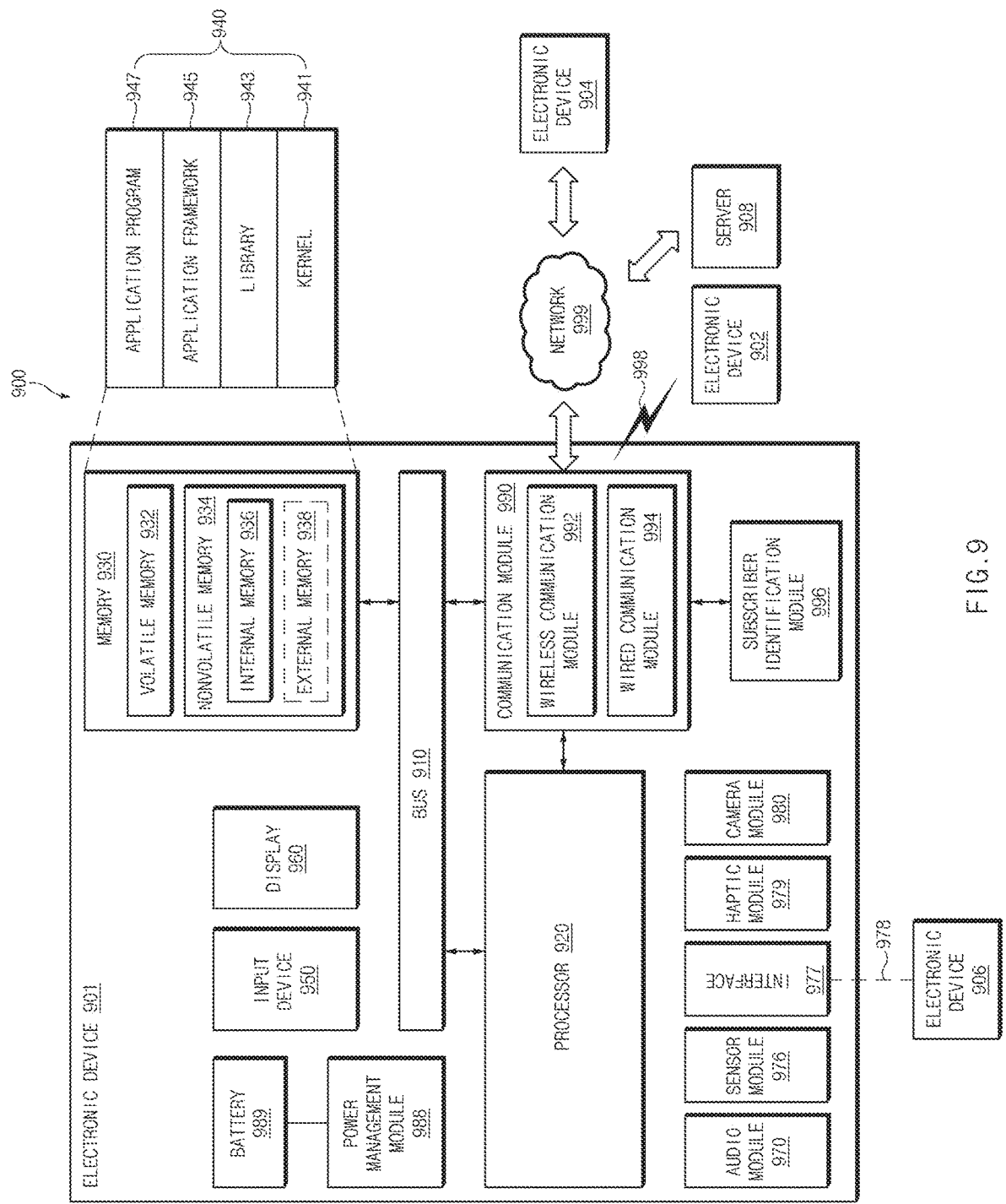
FIG. 9 is a block diagram illustrating a configuration of an electronic device in a network environment according to an embodiment of the present disclosure.

FIG. 9 is a block diagram illustrating a configuration of an electronic device in a network environment according to an embodiment of the present disclosure.

Referring to FIG. 9, under the network environment 900, the electronic device 901 (e.g., an electronic device 100 of FIG. 3) may communicate with an electronic device 902 through local wireless communication 998 or may communication with an electronic device 904 or a server 908 through a network 999. According to an embodiment, the electronic device 901 may communicate with the electronic device 904 through the server 908.

According to an embodiment, the electronic device 901 may include a bus 910, a processor 920 (e.g., at least one processor 150 of FIG. 3) a memory 930, an input device 950 (e.g., a micro-phone or a mouse), a display 960, an audio module 970, a sensor module 976, an interface 977, a haptic module 979, a camera module 980, a power management module 988, a battery 989, a communication module 990, and a subscriber identification module 996. According to an embodiment, the electronic device 901 may not include at least one (e.g., the display 960 or the camera module 980) of the above-described elements or may further include other element(s).

For example, the bus 910 may interconnect the above-described elements 920 to 990 and may include a circuit for conveying signals (e.g., a control message or data) between the above-described elements. The processor 920 may include one or more of a central processing unit (CPU), an application processor (application), a graphic processing unit (GPU), a camera image signal processor (ISP) of a camera or a communication processor (CP). According to an embodiment, the processor 920 may be implemented with a system on chip (Soc) or a system in package (SiP). For example, the processor 920 may drive an operating system (OS) or an application to control at least one of another element (e.g., hardware or software element) connected to the processor 920 and may process and compute various data. The processor 920 may load an instruction or data, which is received from at least one of other elements (e.g., the communication module 990), into a nonvolatile memory 932 to process the instruction or data and may store the process result data into the nonvolatile memory 934.

The memory 930 may include, for example, a volatile memory 932 or a nonvolatile memory 934. The volatile memory 932 may include, for example, a random access memory (RAM) (e.g., a dynamic random access memory (DRAM), a static RAM (SRAM), or a synchronous dynamic RAM (SDRAM)). The nonvolatile memory 934 may include, for example, one time programmable read-only memory (OTPROM), programmable read-only memory (PROM), an erasable programmable read-only memory (EPROM), an electrically erasable programmable read-only memory (EEPROM), a mask ROM, a flash ROM, a flash memory, a hard drive, or a solid-state drive (SSD). In addition, the nonvolatile memory 934 may be configured in the form of an internal memory 936 or the form of an external memory 938 which is available through connection only if necessary, according to the connection forms of the electronic device 901. The external memory 938 may further include a flash drive such as compact flash (CF), secure digital (SD), micro secure digital (micro-SD), mini secure digital (mini-SD), extreme digital (xD), a multimedia card (MMC), or a memory stick. The external memory 938 may be operatively or physically connected with the electronic device 901 in a wired manner (e.g., a cable or a universal serial bus (USB)) or a wireless (e.g., bluetooth(BT)) manner.

For example, the memory 930 may store, for example, at least one different software element, such as an instruction or data associated with the program 940, of the electronic device 901. The program 940 may include, for example, a kernel 941, a library 943, an application framework 945 or an application program (interchangeably, "application") 947.

The input device 950 may include a microphone, a mouse, or a keyboard. According to an embodiment, the keyboard may include a keyboard physically connected or a keyboard virtually displayed through the display 960.

The display 960 may include a display, a hologram device or a projector, and a control circuit to control a relevant device. The screen may include, for example, a liquid crystal display (LCD), a light emitting diode (LED) display, an organic LED (OLED) display, a plastic OLED (POLED), a microelectromechanical systems (MEMS) display, or an electronic paper display. According to an embodiment, the display may be flexibly, transparently, or wearably implemented. The display may include a touch circuitry, which is able to detect a user's touch input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 901.

The audio module 970 may convert, for example, from a sound into an electrical signal or from an electrical signal into the sound. According to an embodiment, the audio module 970 may acquire sound through the input device 950 (e.g., a microphone) or may output sound through an output device (not illustrated) (e.g., a speaker or a receiver) included in the electronic device 901, an external electronic device (e.g., the electronic device 902 (e.g., a wireless speaker or a wireless headphone)) or an electronic device 906 (e.g., a wired speaker or a wired headphone)connected with the electronic device 901

The sensor module 976 may measure or detect, for example, an internal operating state (e.g., power or temperature) or an external environment state an altitude, a humidity, or brightness) of the electronic device 901 to generate an electrical signal or a data value corresponding to the information of the measured state or the detected state. The sensor module 976 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (FIRM) sensor, an e-nose sensor, an electromyography (EMG) sensor, an electroencephalogram (EEG) sensor, an electrocardiogram (ECG) sensor, a temperature sensor, a humidity sensor, an illuminance sensor or an UV sensor. The sensor module 976 may further include a control circuit for controlling at least one or more sensors included therein. According to an embodiment, the sensor module 976 may be controlled by using the processor 920 or a processor (e.g., a sensor hub) separate from the processor 920. In the case that the separate processor (e.g., a sensor hub) is used, while the processor 920 is a sleep state, the separate processor may operate without awakening the processor 920 to control at least a portion of the operation or the state of the sensor module 976.

According to an embodiment, the interface 977 may include a high definition multimedia interface (HDMI), a universal serial bus (USB), an optical interface, a recommended standard 232 (RS-232), a D-subminiature (D-sub), a mobile high-definition link (MHL) interface, a SD card/MMC(multi-media card) interface, or an audio interface. A connector 978 may physically connect the electronic device 901 and the electronic device 906. According to an embodiment, the connector 978 may include, for example, an USB connector, an SD card/MMC connector, or an audio connector (e.g., a headphone connector), The haptic module 979 may convert an electrical signal into mechanical stimulation (e.g., vibration or motion) or into electrical stimulation. For example, the haptic module 979 may apply tactile or kinesthetic stimulation to a user. The haptic module 979 may include, for example, a motor, a piezoelectric element, or an electric stimulator.

The camera module 980 may capture, for example, a still image and a moving picture. According to an embodiment, the camera module 980 may include at least one lens (e.g., a wide-angle lens and a telephoto lens, or a front lens and a rear lens), an image sensor, an image signal processor (ISP), or a flash (e.g., a light emitting diode or a xenon lamp).

The power management module 988, which is to manage the power of the electronic device 901, may constitute at least a portion of a power management integrated circuit (PMIC).

The battery 989 may include a primary cell, a secondary cell, or a fuel cell and may be recharged by an external power source to supply power at least one element of the electronic device 901.

The communication module 990 may establish a communication channel between the electronic device 901 and an external device (e.g., the first external electronic device 902, the second external electronic device 904, or the server 908). The communication module 990 may support wired communication or wireless communication through the established communication channel. According to an embodiment, the communication module 990 may include a wireless communication module 992 or a wired communication module 994. The communication module 990 may communicate with the external device (e.g., the first external electronic device 902, the second external electronic device 904 or the server 908) through a first network 998 (e.g. a wireless local area network (LAN) such as Bluetooth (BT) or infrared data association (IrDA)) or a second network 999 (e.g., a wireless wide area network such as a cellular network) through a relevant module among the wireless communication module 992 or the wired communication module 994.

The wireless communication module 992 may support, for example, cellular communication, local wireless communication, global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), WiFi Direct, light fidelity, Bluetooth, Bluetooth low energy (BLE), Zigbee, near field communication (NEC), magnetic secure transmission (MST), radio frequency (RF), or a body area network (BAN). The GNSS may include at least one of a global positioning system (GPS), a global navigation satellite system (Glonass), Beidou Navigation Satellite System (Beidou) or Galileo, the European global satellite-based navigation system, or the like. In the present disclosure, "GPS" and "GNSS" may be interchangeably used.

According to an embodiment, when the wireless communication module 992 supports cellar communication, the wireless communication module 992 may, for example, identify or authenticate the electronic device 901 within a communication network using the subscriber identification module (e.g., a SIM card) 996. According to an embodiment, the wireless communication module 992 may include the processor 920 (e.g., an application processor (AP) and a separate communication processor (CP). In this case, the communication processor may perform at least a portion of functions associated with at least one of elements 910 to 996 of the electronic device 901 in substitute for the processor 920 when the processor 920 is in an inactive (sleep) state, and together with the processor 920 when the processor 920 is in an active state. According to an embodiment, the wireless communication module 992 may include a plurality of communication modules, each supporting only a relevant communication scheme among cellular communication, short-range wireless communication, or a GNSS communication scheme.

The wired communication module 994 may include, for example, include a local area network (LAN) service, a power line communication, or a plain old telephone service (POTS).

For example, the first network 998 may employ, for example, WiFi direct or Bluetooth for transmitting or receiving instructions or data through wireless direct connection between the electronic device 901 and the first external electronic device 902. The second network 999 may include a telecommunication network (e.g., a computer network such as a LAN or a WAN, the Internet or a telephone network) for transmitting or receiving instructions or data between the electronic device 901 and the second electronic device 904.

According to embodiments, the instructions or the data may be transmitted or received between the electronic device 901 and the second external electronic device 904 through the server 908 connected with the second network. Each of the external first and second external electronic devices 902 and 904 may be a device of which the type is different from or the same as that of the electronic device 901. According to various embodiments, all or a part of operations that the electronic device (901 will perform may be executed by another or a plurality of electronic devices (e.g., the electronic devices 902 and 904 or the server 908. According to an embodiment, in the case that the electronic device 901 executes any function or service automatically or in response to a request, the electronic device 901 may not perform the function or the service internally, but may alternatively or additionally transmit requests for at least a part of a function associated with the electronic device 901 to another device (e.g., the electronic device 902 or 904 or the server 908). The another electronic device (e.g., the electronic device 902 or 904 or the server 908) may execute the requested function or additional function and may transmit the execution result to the electronic device 901. The electronic device 901 may provide the requested function or service using the received result or may additionally process the received result to provide the requested function or service. To this end, for example, cloud computing, distributed computing, or client-server computing may be used.

The terms of a singular form may include plural forms unless otherwise specified. In the present disclosure, the expressions "A or B", "at least one of A and/or B", "A, B, or C", or at least one of "A, B and/or C" may include all possible combinations of one or more of the associated listed items. The terms such as "first", "second", and the like used herein may refer to various elements regardless of the order and/or priority of the elements and may be used to distinguish an element from another element, not to limit the elements. It will be understood that when an element (e.g., a first element) is referred to as being "(operatively or communicatively) coupled with/to" or "connected to" another element (e.g., a second element), the element may be directly coupled with/to or connected to the another element or an intervening element (e.g., a third element) may be present therebetween.

In the present disclosure, according to the situation, the expression "adapted to or configured to" used herein may be interchangeably used with, for example, the expression "suitable for", "having the capacity to", "changed to", "made to", "capable of", or "designed to" "adapted to", "made to", or "capable of". Under a certain situation, the expression "a device configured to" may mean that the device is "capable of" operating together with another device or other components. For example, a "processor configured to (or adapted to) perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device (e.g. 930).

The term "module" as used in the present disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to an embodiment of the present disclosure may be, for example, implemented by instructions stored in a computer-readable storage media in the form of a program module. The instruction, when executed by a processor 920, may cause the one or more processors to perform a function corresponding to the instruction. The computer-readable storage media, for example, may be the memory 930.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as generated by a compiler but also a high-level language code executable on a computer using an interpreter. The above hardware unit may be configured to operate via one or more software modules for performing an operation according to an embodiment of the present disclosure, and vice versa.

A module or a program module according to an embodiment of the present disclosure may include at least one of the above elements, or a part of the above elements may be omitted, or additional other elements may be further included. Operations performed by a module, a program module, or other elements may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a memory to store an image of a multi-field of view (multi-FOV), the image of the multi-FOV including an image of a first FOV and an image of a second FOV;
   a display to output the image of the multi-FOV; and
   at least one processor electrically connected with the memory and the display,
   wherein the at least one processor is configured to:
      control the display to output the image of the first FOV on the display,
      verify at least one event which meets a condition from the image of the second FOV, and
      control the display to provide a notification corresponding to the at least one event in connection with the image of the first FOV, the image of the first FOV being output on the display.

2. The electronic device of claim 1, wherein the at least one processor is further configured to:
   verify at least one event, which occurs within a time range with respect to a current playback time of the image of the first FOV, as the event.

3. The electronic device of claim 1, wherein the at least one processor is further configured to:
   control the display to change the image of the first FOV, output on the display, to at least part of the image of the second FOV in response to a user input on the notification.

4. The electronic device of claim 3, wherein the at least one processor is further configured to:
   provide another notification for supporting a change to the image of the first FOV, in connection with the at least part of the image of the second FOV.

5. The electronic device of claim 4, wherein the at least one processor is further configured to:
   specify the change to the image of the first FOV as a return event.

6. The electronic device of claim 4, wherein the at least one processor is further configured to:
    based on a change to the image of the first FOV or the image of the second FOV, provide at least part of the image of the multi-FOV at a speed in the image change.

7. The electronic device of claim 1, wherein the at least one processor is further configured to:
    calculate a relative location of the event with respect to the first FOV; and
    calculate a time based on a notification corresponding to the event being provided, in connection with the relative location.

8. The electronic device of claim 1, wherein the at least one processor is further configured to:
    specify at least one of an object having mobility of a size or more, included in the image of the multi-FOV, or an object which is identical to a subject by a size or more as the event.

9. The electronic device of claim 1, wherein the at least one processor is further configured to:
    provide a range, from a time when the event initially occurs to a time when a time elapses, in a time range where the event occurs on the image of the multi-FOV as the notification corresponding to the event.

10. The electronic device of claim 1, wherein the at least one processor is further configured to:
    provide information about a time interval between a time when the providing of the notification is started and a time when the event occurs, as at least part of the notification corresponding to the event.

11. The electronic device of claim 1, wherein the at least one processor is further configured to:
    provide information about a relative direction between the first time and the second time associated with the event, as at least part of the notification corresponding to the event.

12. The electronic device of claim 1, wherein the at least one processor is further configured to:
    process a first notification corresponding to an event which occurs before a current playback time of the image of the first FOV and a second notification corresponding to an event which will occur after the current playback time using different effects.

13. The electronic device of claim 1, wherein the at least one processor is further configured to:
    generate a development image corresponding to the multi-FOV;
    control the display to output the development image on at least a partial region of the display; and
    include at least one information associated with the event on the development image.

14. The electronic device of claim 1, wherein the electronic device is configured to be mountable on a head mounted display (HMD) device.

15. The electronic device of claim 1, wherein the at least one processor is further configured to:
    obtain a user input on the notification; and
    output at least part of the image of the second FOV in response to the user input.

16. The electronic device of claim 15, wherein the at least one processor is further configured to:
    based on the image of the second FOV including at least one event which occurs within a time range with respect to a current playback time of the image of the first FOV, provide a range, from a time when the event initially occurs to a time when a time elapses, in a time range when the event occurs on the image of the second FOV as the notification.

* * * * *